United States Patent
Khowash et al.

(10) Patent No.: US 7,966,233 B1
(45) Date of Patent: Jun. 21, 2011

(54) METHOD FOR END TO END DATA SYNCHRONIZATION FOR NETWORKING ARRANGEMENT

(75) Inventors: Pradeep Khowash, Marlboro, NJ (US); Deven Chandrakant Meghani, Clifton, NJ (US); Yang Li, Matawan, NJ (US); Pravinchandra Chokshi, Sayreville, NJ (US); Prakash Talur, Bordentown, NJ (US); Prakash Vasa, Clarksburg, NJ (US); Liem Nguyen, Colts Neck, NJ (US); Patricia Seglio Donohue, Shrewsbury, NJ (US); John McCanuel, Bailey, CO (US); Hossein Eslambolchi, Los Altos Hills, CA (US); Anand Kumar Singh, Marlboro, NJ (US); Paritosh Bajpay, Edison, NJ (US); Roger Aboujaoude, Ocean Township, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1090 days.

(21) Appl. No.: 11/321,072

(22) Filed: Dec. 30, 2005

(51) Int. Cl.
*G07F 19/00* (2006.01)
*G06Q 99/00* (2006.01)
*G06Q 30/00* (2006.01)
*G06Q 40/00* (2006.01)

(52) U.S. Cl. ............ 705/34; 705/1.1; 705/26.1; 705/40
(58) Field of Classification Search .................. 705/26, 705/27, 1, 40, 1.1, 26.1, 34
See application file for complete search history.

(56) References Cited

U.S. PATENT DOCUMENTS

| | | | |
|---|---|---|---|
| 6,549,906 B1 * | 4/2003 | Austin et al. | 707/10 |
| 2002/0111889 A1 * | 8/2002 | Buxton et al. | 705/35 |
| 2003/0036918 A1 * | 2/2003 | Pintsov | 705/1 |
| 2004/0133488 A1 * | 7/2004 | Daidone et al. | 705/34 |
| 2004/0148257 A1 * | 7/2004 | Garcia | 705/40 |
| 2004/0153821 A1 * | 8/2004 | Kuhmann et al. | 714/38 |
| 2004/0267559 A1 * | 12/2004 | Hinderer et al. | 705/1 |
| 2005/0034042 A1 * | 2/2005 | Davies et al. | 714/736 |
| 2005/0246277 A1 * | 11/2005 | Bloem et al. | 705/42 |
| 2006/0095373 A1 * | 5/2006 | Venkatasubramanian et al. | 705/40 |

OTHER PUBLICATIONS

Author unknown, "CommSoft Introduces CommSoft Interface Engine," Customer Interactions Solution, Jun. 2003.*

* cited by examiner

*Primary Examiner* — Amee A Shah

(57) ABSTRACT

An arrangement collects data from disparate system back-end sources, such as a contracts system, a billing system, a service provisioning system, and analyzes the data to determine whether any inconsistencies exist. If so, the system issues a modification request to compensate for the inconsistency.

6 Claims, 1 Drawing Sheet

METHOD FOR END TO END DATA SYNCHRONIZATION FOR NETWORKING ARRANGEMENT

BACKGROUND

The invention generally relates to synchronizing customer data related to network services. More specifically, the invention relates to bringing together disparate types of data that relate to defining a customer's relationship to a service network and source provider to assure that billing, services ordering, and service provisioning (among other needs) are in harmony.

It is known within at least certain telecommunications services provider arrangements that there are a multitude of systems referred to as back-end systems which support the network service provider operations. These systems go beyond simply the actual processing of telecommunications requests or setting up communication sessions or calls. They cover such systems as tracking contracts between the service provider and particular customers, managing inventory of the capabilities or facilities within the network, tracking data about the operations of the network for maintenance purposes, and maintaining billing information which is important for the services provider to generate so as to bill customers accurately in connection with the provisioning of the services.

It may turn out that there are inconsistencies that arise in connection with information in these respective back-end systems. For example, an invoice provided to a customer may not accurately reflect the provisioned inventory that is being provided on behalf of the customer. The result is that a mismatch could result in an improper billing or a failure to indicate that the appropriate levels of provisioning have been met. Similarly there can be mismatches between services requested and services provided. These mismatches can cause reductions in revenue, can lead to increases in disputes between the customer and the services provider and can create general discord that can disrupt the quality of service that a customer receives or experiences.

It would be beneficial if there was a technique available for detecting such inconsistencies between the data sets of the respective back-end systems.

SUMMARY

In an embodiment an audit system periodically gathers back-end data related to each of a plurality of customers. The audit system analyzes and correlates data related to customer orders, service provider billing and provisioning and determines where, if any, discord or inconsistencies exist. Billing, provisioning can then be adjusted accordingly.

The audit system may also take into account contract information related to the customer, service provider inventory, and service provider invoicing.

DETAILED DESCRIPTION

Figure 1:
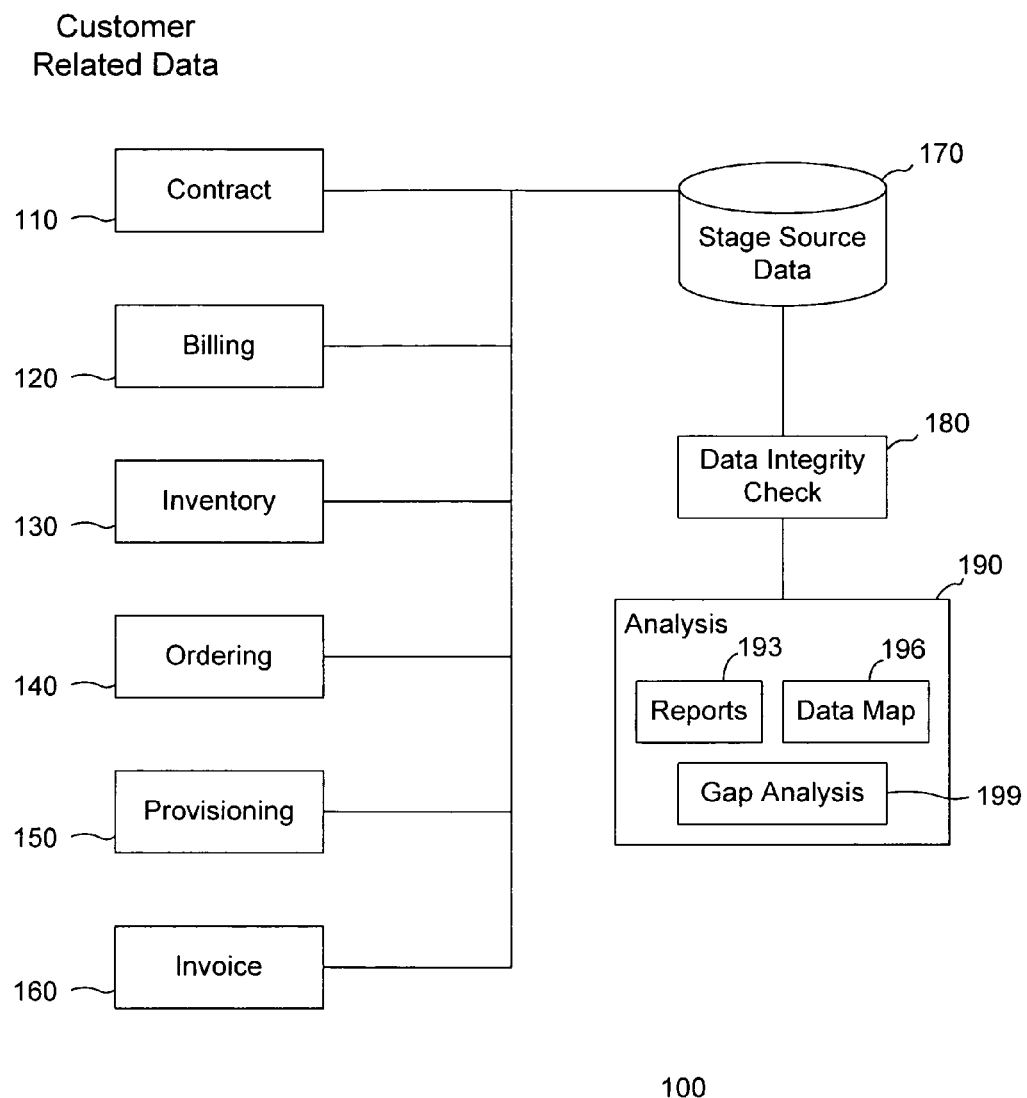
FIG. 1 illustrates a block diagram of an arrangement for implementing an embodiment of the invention.

In accordance with an embodiment of the invention a system provides for a technique for searching through the information contained in a plurality of back-end systems so as to discover and note any inconsistencies or discord between information and the respective back-end systems. Once this information about inconsistencies is noted and identified, the information can then be presented to an appropriate department associated with the services provider so as to address or harmonize these inconsistencies.

FIG. 1 illustrates in block diagram form an arrangement which can be used to implement an embodiment of the present invention.

In accordance with FIG. 1 there are illustrated six example back-end systems which may be of interest to the network services provider. These six systems are considered to be exemplary and not an exhaustive list. Furthermore, it should be recognized that the six provided need not all be provided to gain the benefits of the processes of the present invention.

The six example back-end systems illustrated in FIG. 1 include the back-end system which monitors or tracks contract information related to contracts for services between the network services provider and its customers (110). A second back-end system relates to the billing operations for the network services provider, namely those operations which track network usage and generate billing information related to such usage (120). The third back-end system of interest relates to the network services providers tracking of the inventory of network facilities, that is tracking those network facilities that are in use and that those that are available for use (130). A fourth network back-end system which may be of interest concerns a back-end system which relates to handling customers' orders for services, that is to the extent that a customer under the terms of a given contract either adds or upgrades or downgrades services (such as quality of service requirements) the ordering system may keep track of such order requests (140). A fifth system which is of interest to the network services provider is a system which responds to customer orders and actually provisions facilities/quality of service on behalf of customers in part based on contract and ordering requirements (150). A sixth system of interest to the network services provider is an invoicing system which generates information based on the billing information and actually provides invoices to customers and processes the receipt of payments in response to such invoices (160).

In accordance with an embodiment of the invention, on a periodic basis the network services provider prompts an analysis for inconsistencies related to a given customer. In that regard the system then collects records pertaining to the customer in question from each of the six different back-end systems. That is, the inconsistency check or operation calls for pulling customer related data from each of the six systems which we have described above. The information with regard to that particular customer can then be appropriately formatted so as to be stored in a database referred to as stage source data 170 in FIG. 1. It is recognized that based on the disparity of the systems involved in the six back-end systems illustrated in FIG. 1 it may be necessary for there to be some format translation or conversion between the respective types of customer related data so as to enable the system to process this combined collection of data related to a given customer. Once the data has been harmonized for analysis the data can be subjected to a data integrity check 180. The data integrity check can then sort through all of the data related to a given customer to assure that there are no inconsistencies in the data sets for a given customer. For example, it would be of particular interest to a network services provider if the customer has requested or ordered a certain set of services requiring particular network facilities and there is an inconsistency between that request and the facilities actually being provided by the network services provider, for example, the order has not been adequately addressed and fewer services or facilities are being actually provided on behalf of the customer. If this type of inconsistency is noted then the network services provider may want to take some action based on this data integrity check so as to assure that this inconsistency is resolved whereby appropriate are provisioned on behalf of the customer.

Another example of an inconsistency which would be of particular interest to the network provider and the customer would be an inconsistency relating to billing. For instance, the parties would be both interested to the extent that billing for provisioned services presented by the network provider is any way inconsistent with the agreed upon terms under the contract terms or whether there is any inconsistency between the billing asserted and the provisioning of services or facilities from the network services provider. Again, such an inconsistency would be discovered by the data integrity check 180 and as a result the interested system or systems operations groups within the network services provider would be advised of this inconsistency and could take appropriate action to resolve it.

As indicated above, once the data integrity check has been performed, further analysis with regard to the detected integrity issues can be performed by element 190. This analysis element provides the capability of generating reports 193, data maps 196, and any analysis with regard to data gaps 199.

As noted above, this data check operation for a given customer can be prompted periodically. The systems can all be at geographically distant locations from each other or be on different control systems. Various networking arrangements can be utilized to pull the data together to the stage source data database 170 including wide area network arrangements and local area network arrangements. The types of data format resolution techniques that could be employed are equally numerous and are ones of design choice depending upon the format associated with the respective back-end systems utilized by the network services provider. The particulars of these format translations do not form significant aspect of the instant invention.

One of ordinary skill in the art would appreciate that the data analysis or data integrity check could be performed using a data processing arrangement operating in conjunction with rules defined by software. The data processing arrangement can use one or more processing elements arranged either proximate to or integrated with one or more of the back end systems. Alternatively the processing arrangement can be distinct the back end systems, and perhaps even geographically remote from those systems.

The present invention provides an automatic auditing tool which extends the audit capabilities of the service provider so as to not only cover auditing with regard to the quality of service provided on behalf of the customers, but also bringing together various back-end systems so as to determine whether any inconsistencies arise which might give rise to disputes with the customer over such things as provided services and/or billing or such services.

CONCLUSION

While various embodiments of the invention have been described above, it should be understood that they have been presented by way of example only, and not limitation. For example although the above methods are shown and described above as a series of operations occurring in a particular order, in some embodiments, certain operations can be completed in a parallel fashion. In other embodiments, the operations can be completed in an order that is different from that shown and described above.

What is claimed is:

1. A method comprising:
    identifying a customer;
    retrieving first data records related to the customer, the first data records related to an order of a service by the customer;
    retrieving second data records related to the customer, the second data records related to billing information associated with the customer;
    retrieving third data records related to the customer, the third data records related to the service provisioned on behalf of the customer;
    retrieving fourth data records related to contract information for the customer;
    analyzing the first, second, third and fourth data records to identify an inconsistency between the data records, wherein the analyzing is performed by a processing element, wherein the analyzing includes:
        extracting data from each of the first, second, third and fourth data records;
        transforming the extracted data, wherein the transforming comprises a format translation of the extracted data; and
        processing the transformed data to identify the inconsistency pertaining to the order of the service by the customer in relation to the contract information for the customer; and
    issuing a modifying request to address the inconsistency.

2. The method of claim 1, wherein, when the inconsistency further relates to an inconsistency between the order of the service by the customer and the service being provisioned on behalf of the customer, the modifying request comprises a request to adjust the service provisioned on behalf of the identified customer to compensate for the inconsistency that has been identified.

3. The method of claim 1, wherein, when the inconsistency that has been identified further relates to an inconsistency between the services provisioned on behalf of the identified customer and billing information associated with the identified customer, the modifying request comprises a request to adjust the billing information associated with the customer to compensate for the inconsistency.

4. The method of claim 1, further comprising:
    retrieving fifth data records related to the customer, the fifth data records related to a service provider inventory; and
    referring to the fifth data records in connection with the analyzing to identify any inconsistencies involving the first, second, third, fourth and fifth data records.

5. The method of claim 4, further comprising:
    retrieving sixth data records related to the customer, the sixth data records related to invoices for the customer; and
    referring to the sixth data records in connection with the analyzing to identify any inconsistencies involving the first, second, third, fourth, fifth and sixth data records.

6. The method of claim 1, further comprising:
    retrieving fifth data records related to the customer, the fifth data records related to invoices for the customer; and
    referring to the fifth data records in connection with the analyzing to identify any inconsistencies involving the first, second, third, fourth and fifth data records.

* * * * *